July 27, 1943.  G. W. AEGERTER  2,325,022

CIGARETTE PACKAGE

Filed April 12, 1940  4 Sheets-Sheet 1

INVENTOR:
Gustave W. Aegerter.
BY Fredk J. Charon
ATTORNEY.

July 27, 1943.  G. W. AEGERTER  2,325,022
CIGARETTE PACKAGE
Filed April 12, 1940  4 Sheets-Sheet 2

INVENTOR:
Gustave W. Aegerter.
BY
ATTORNEY.

July 27, 1943.  G. W. AEGERTER  2,325,022
CIGARETTE PACKAGE
Filed April 12, 1940  4 Sheets-Sheet 3
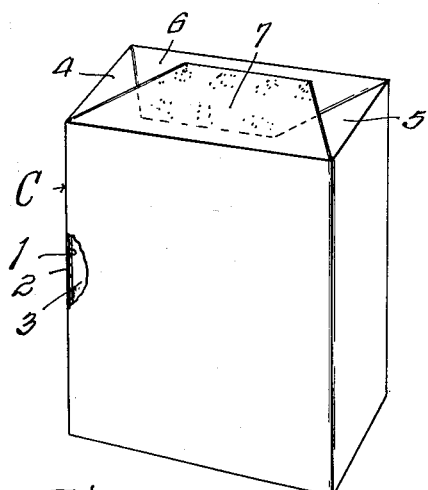
Fig. 13.
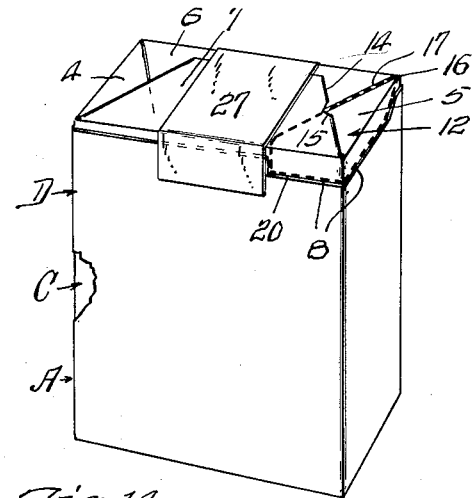
Fig. 14.
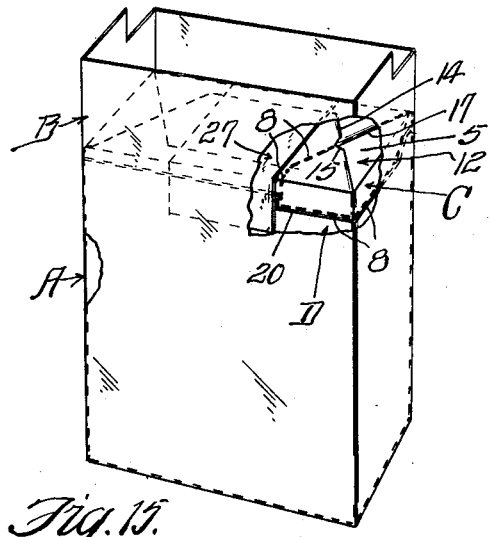
Fig. 15.
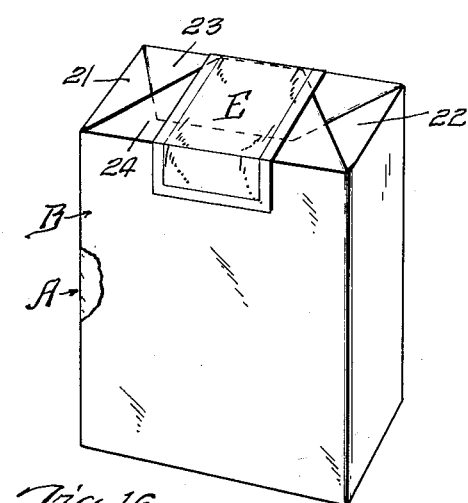
Fig. 16.
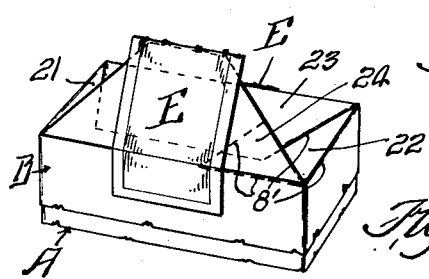
Fig. 17.
Fig. 18.
INVENTOR.
Gustave W. Aegerter.
BY
ATTORNEY.

July 27, 1943.  G. W. AEGERTER  2,325,022
CIGARETTE PACKAGE
Filed April 12, 1940  4 Sheets-Sheet 4

INVENTOR:
Gustave W. Aegerter.
BY
ATTORNEY.

Patented July 27, 1943

2,325,022

UNITED STATES PATENT OFFICE 2,325,022

CIGARETTE PACKAGE

Gustave W. Aegerter, St. Louis, Mo.

Application April 12, 1940, Serial No. 329,373

1 Claim. (Cl. 229—51)

My invention relates to cigarette packages.

The object of my invention is to provide a combination wax paper and foil cigarette package adapted to be enclosed in a transparent protective wrapper, with a circuitous line of perforations so that a local section of the package can be easily and readily torn away to provide a cigarette outlet for the package, and, at the same time destroy the revenue stamp affixed thereto.

A further object of the invention is to provide a combination wax paper and foil cigarette package having a label wrapper, enclosed in a transparent protective wrapper, with a circuitous line of perforations so that a local section of the package can be easily and readily torn away to provide a cigarette outlet in the top of the package and partly down the front and one side thereof, and, at the same time destroy the revenue stamp affixed to the package.

A further object of the invention is to affix a revenue stamp to a transparent protective wrapper enclosing a cigarette package, so that when the protective wrapper is opened at one end to remove, or expose the top of the cigarette package, the revenue stamp will be destroyed.

A further object of the invention is to seal a cigarette package by means other than a revenue stamp, when the package is enclosed in a transparent protective wrapper, and to seal the transparent protective wrapper by means of a revenue stamp.

A further object of the invention is to provide a cigarette package, enclosed in a transparent wrapper, with a circuitous line of perforations to define a section thereof to be removed when the package is enclosed in a transparent protective wrapper, and to affix a revenue stamp to the transparent wrapper to render it impossible to remove cigarettes from the enclosed package until the stamp on the transparent protective wrapper has been broken, after which the package can be either removed from the transparent protective wrapper, or at least one end thereof exposed.

With the above and other objects in view, the invention consists in the novel features of a cigarette package construction, arrangement and combination of elements therefor as required to provide a lawful cigarette package hereinafter more fully described, and finally pointed out in the claim hereto appended.

Referring to the drawings forming a part of this specification, wherein like characters of reference denote similar parts throughout the several views:

Fig. 7 shows the wax paper and foil package in perspective, in such modified form.

Fig. 8 shows the package and an open top label wrapper assembled, in perspective, to complete the cigarette package, and the cigarette package is shown as sealed with a revenue stamp.

Fig. 9 shows the cigarette package assembled with an outer transparent protective wrapper, in perspective, before the upper end of the protective wrapper is folded and sealed.

Fig. 10 is a perspective view of the transparent protective wrapper with its upper end folded and sealed to protect the cigarette package therein.

Fig. 11 is a top plan view of the cigarette package removed from its protective wrapper, and showing the stamp broken and a cigarette outlet formed in accordance with my invention.

Fig. 12 is a fragmentary perspective view of the cigarette package after the stamp has been broken, and the cigarette outlet formed by removal of a local section of the cigarette package material.

Figures 13 to 17 illustrate a further modification of the invention, and;

Fig. 13 shows the paper and foil package in perspective.

Fig. 14 shows the package and an open top label wrapper assembled, in perspective, and such cigarette package is shown as sealed in a fashion other than with a revenue stamp.

Fig. 15 shows the cigarette package assembled with an outer transparent protective wrapper, in perspective, before the upper end thereof is folded and sealed with a revenue stamp in accordance with my invention.

Fig. 16 is a perspective view of the transparent protective wrapper with its upper end folded to enclose the cigarette package therein, and the folded end of the outer protective wrapper is sealed by affixing a revenue stamp thereto.

Fig. 17 is a fragmentary perspective view of the completely assembled package showing one of the transparent protective wrapper folds raised and the revenue stamp broken before entrance can be had to the cigarette package enclosed.

Fig. 18 is a fragmentary perspective view of the cigarette package after being removed from the protective wrapper with the broken stamp, showing the package as opened at one corner for removing cigarettes therefrom.

Figure 6:
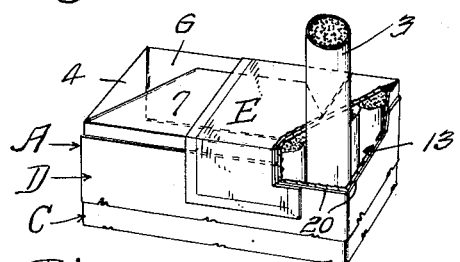
Fig. 6 is a fragmentary perspective view of the cigarette package after the stamp has been broken, and the cigarette outlet formed by the removal of a local section of the cigarette package material.
Figure 22:
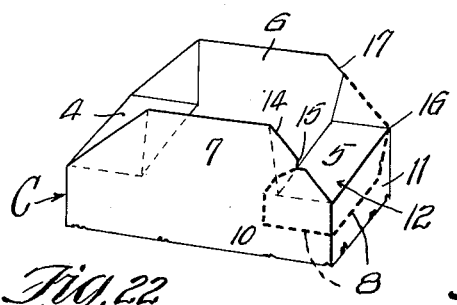

Fig. 22 is a fragmentary perspective view showing the path the circuitous line of perforations takes after the upper end of the package material has been shaped to provide the closure folds so that when that section of the package within the circuitous line of perforations is removed a cigarette outlet will be provided, as shown in Fig. 6, as well as destroying the revenue stamp affixed to the package.

Figure 11:
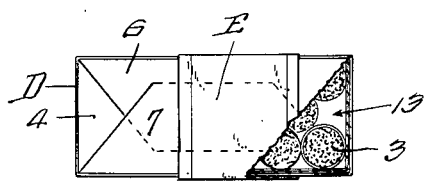
Figure 12:
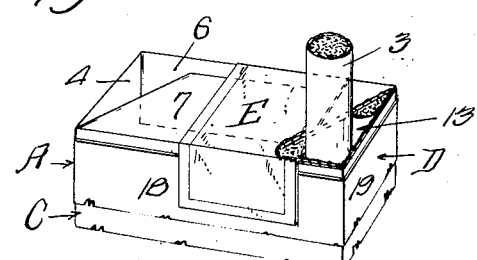
Figure 23:
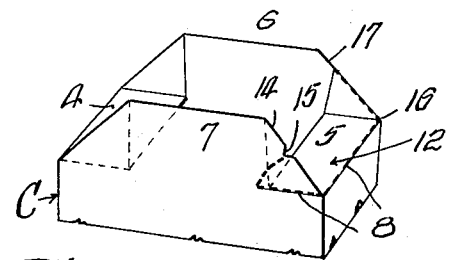

Fig. 23 is a fragmentary perspective view showing the path the circuitous line of perforations takes after the upper end of the package material has been shaped to provide the closure folds, so that when the section of the package material within the bounds of the circuitous line of perforations is removed, a cigarette outlet will be provided, as shown in Figs. 11 and 12, as well as destroying the revenue stamp.

Figure 24:
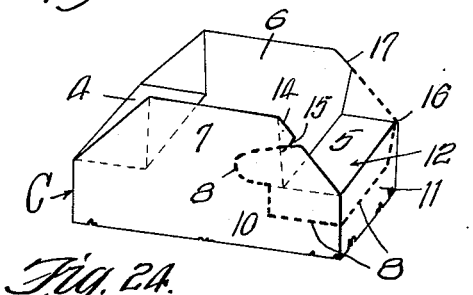
Figure 25:
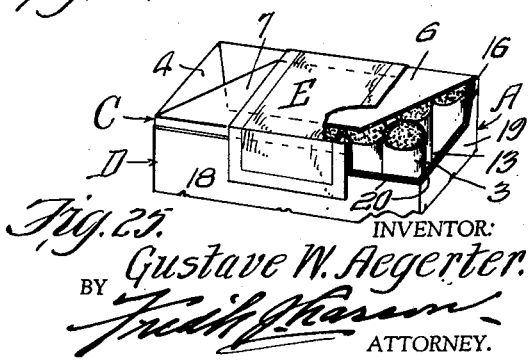

Fig. 24 is a fragmentary perspective view showing the path the circuitous line of perforations takes after the upper end of the package material has been shaped to provide the usual closure folds, so that when the section of the package material within the bounds of the circuitous line of perforations is removed, a cigarette outlet will be provided, as shown in Fig. 25, as well as destroying the revenue stamp as it is now presently affixed to the cigarette package.

Figure 21:
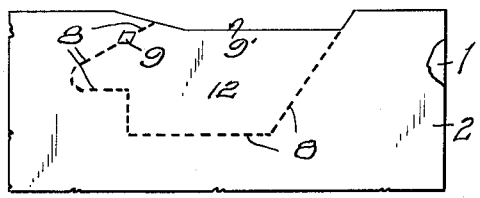
Fig. 21 is a fragmentary view of the wax paper and foil package material, flattened out, clearly showing the circuitous line of perforations for weakening the material and outlining the removable section to provide the cigarette outlet shown in Fig. 25.

Fig. 25 is a fragmentary perspective view of a further modified paper and foil cigarette package after being removed from a transparent outer protective wrapper, and provided with the circuitous line of perforations shown in Figs. 21 and 24 defining a local package section to be removed for destroying the revenue stamp as presently affixed to a cigarette package and to form a cigarette outlet for the package.

Figure 2:
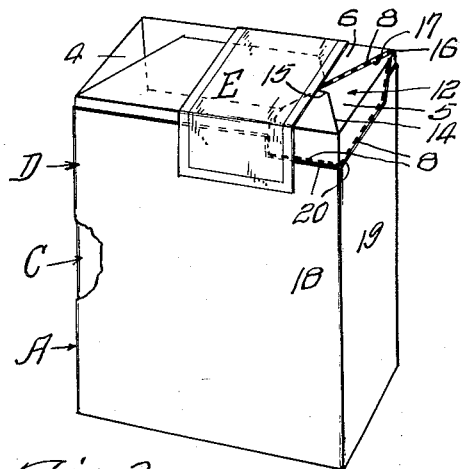
Fig. 2 is a perspective view showing the package and an open top label wrapper assembled to complete the cigarette package, and the cigarette package is shown as sealed with a revenue stamp in accordance with my invention.
Figure 3:
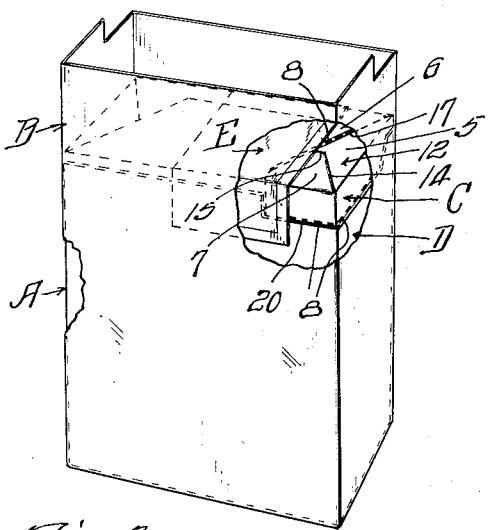
Fig. 3 is a perspective view showing an outer transparent protective wrapper for the cigarette package before the upper end of the wrapper is folded and sealed to completely enclose the cigarette package.
Figure 4:
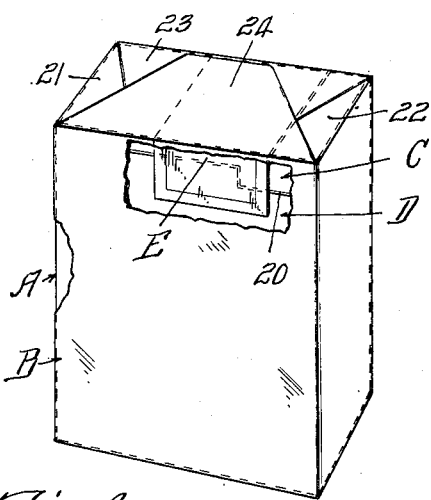
Fig. 4 is a perspective view of the transparent protective wrapper with its upper end folded and sealed to protect the cigarette package therein.
Figure 5:
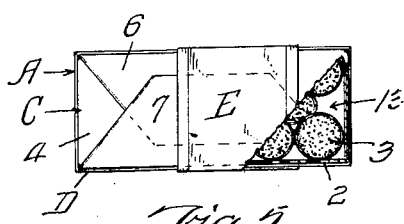
Fig. 5 is a top plan view of the cigarette package removed from its transparent protective wrapper, after the revenue stamp has been broken and a cigarette outlet formed in accordance with my invention.

Referring to the drawings, particularly Figs. 2, 3 and 4, the cigarette package is designated, generally as A, and the usual transparent protective wrapper therefor is designated, generally as B.

Figure 1:
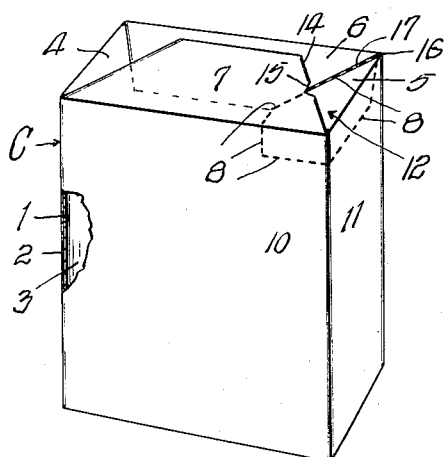
Fig. 1 is a perspective view of a combination paper and foil package for cigarettes embodying a feature of my invention.

The cigarette package A, as shown in Fig. 2, includes a container package designated, generally, as C, and clearly shown in Fig. 1, and the usual open top label wrapper therefor designated, generally, as D.

The revenue stamp required to be affixed to every package of cigarettes is designated throughout the several views as E.

The usual container package C is now formed from an inner sheet of wax paper 1 and an outer sheet of foil 2. When the package A is folded at its upper end to enclose cigarettes 3 therein, it is provided with two side folds designated 4 and 5, a back fold 6 and a front fold 7. The container package C, however, can be made from other material, and from a single sheet of material, if so desired.

Figure 19:
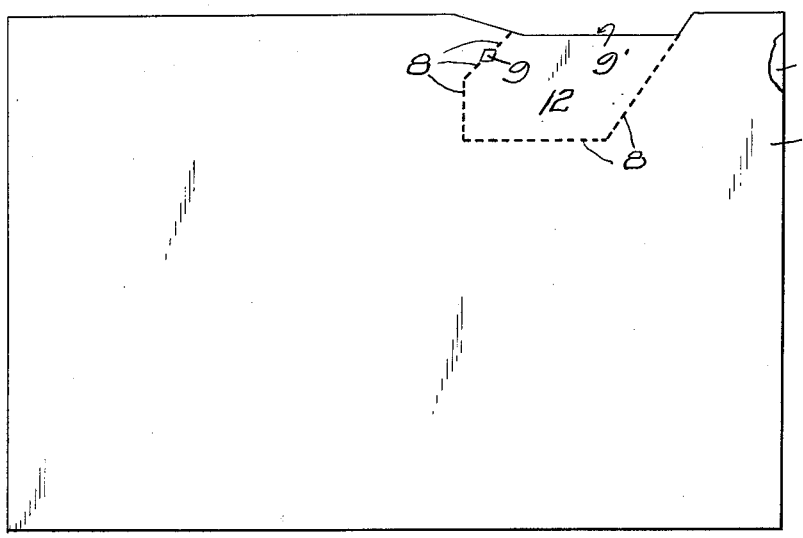
Fig. 19 is a plan view of the combination wax paper and foil package material, flattened out, and clearly showing the circuitous line of perforations for weakening the material, and outlining the removable section thereof to provide the cigarette outlet shown in Fig. 6.
Figure 20:
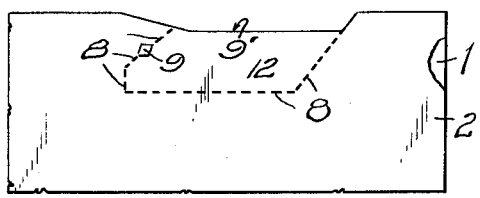
Fig. 20 is a fragmentary view of the wax paper and foil package material, flattened out, clearly showing the circuitous line of perforations for weakening the material and outlining the removable section thereof to provide the cigarette outlet shown in Fig. 12.

In carrying out the features of my invention, as embodied in Figs. 1 to 6, inclusive, I provide the container package material 1 and 2, as shown in Fig. 19, with a circuitous line of indentations or perforations 8, to sufficiently weaken the material along the circuitous line to allow the material to tear easily along such line. Included in the circuitous line is a suitable shaped opening 9 which is disposed below the upper edge of the material. The upper edge of the package material, adjacent the circuitous line 8 can be cut away as at 9' so that the side fold 5 will be smaller than side fold 4.

When the material 1 and 2 is shaped into container package form C, as shown in Fig. 1, to provide the top folds 4, 5, 6 and 7, the perforations 8 forming the circuitous line are then located on the top folds 4 and 5, and on the front and side walls 10 and 11, respectively, of the container package to define an upper corner section 12, which section can be easily removed from the package material to provide a cigarette outlet 13 at the end of the package, as clearly shown in Fig. 6.

When the top of the container package C is formed, as shown in Figs. 1 and 22, it will be observed that the opening 9, as shown in Fig. 19, is disposed at the inclined fold line 14 caused by shaping the material to provide the side fold 5. As clearly shown in Figs. 1 and 22, this provides a suitable notch 15 at the fold line 14, which makes it easy to start to tear the package material along the circuitous weakened line 8 to provide the outlet 13 shown in Figs. 5 and 6.

As will be apparent from Fig. 22, the line of perforations 8 start with the front fold 7, extend downwardly on and transversely of the front wall 10 to one side edge thereof, then across the side wall 11 of the package C to the upper rear corner 16 thereof, and then follow the inclined fold line 17 of the rear fold 6.

After the package C is disposed in the open top label wrapper D, as shown in Fig. 2, the revenue stamp E is affixed to the package A so as to seal the package and render it impossible to remove the contents of the package without breaking the stamp.

As clearly shown in Figs. 2, 3 and 6, a portion of the upper edge portion of the front wall 18 and the side wall 19 of the label wrapper D is provided with a suitable cutaway portion 20 and following a part of the circuitous line of perforations 8 in package C, so that when the upper corner section 12 of the package C, defined by the circuitous line 8, is removed from the package C by tearing the material 1 and 2 thereof to provide the outlet 13, the opening i3 will expose the side of the corner cigarette 3 as well as the upper end thereof, so that it can be readily grasped to be removed from the package without damaging the upper end thereof in the removal thereof, and especially the first cigarette removed from the package while they are still tightly packed.

As shown in Figs. 2, 3, 5 and 6, the stamp E is affixed so as to lie over the perforations 8 in the front fold 7 and part of the perforations in the front wall 10 of the package A, as well as a part of the cutaway portion 20 of the label wrapper D.

From Fig. 6, it will be apparent that when the local section 13, defined by the circuitous line of perforations 8, is removed from the package C, that the revenue stamp E will be destroyed by the removal of a section thereof due to its being adhesively affixed to the top of the package C and partly over the circuitous line of perforations 8.

After the package has been completed and sealed by means of the revenue stamp E, as shown in Fig. 2, the package A is received within the usual transparent outer protective covering B which has its upper end closed by means of the side folds 21 and 22, the back fold 23 and the front fold 24, which folds are sealed in the usual well known manner to protect the package A sealed in the protective wrapper B.

It is, of course, necessary to open the top folds 21, 22, 23 and 24, or otherwise destroy the upper end of the protective wrapper B to gain access to the top of the package C before the section 12 thereof can be removed for destroying the revenue stamp E and to form the outlet 13 by the removal of section 12 from the package C.

In the modification shown in Figs. 7 to 12, inclusive, part of the circuitous line of perforations 8 do not extend down the front wall of the package C, and the label wrapper is not provided with the cutaway portion 20 shown in Fig. 2. In this modification, part of the perforations follow the upper front edge 25 of the package C and the upper side edge 26 thereof, instead of following the edge of the cutaway portion 20 shown in Fig. 2. In this instance, the opening or outlet 13, shown in Fig. 12, is only formed in the top face of the package C and is only of such dimension as to allow one cigarette 3 to be freely removed from the package C, as shown in Figs. 11 and 12.

Figure 7:
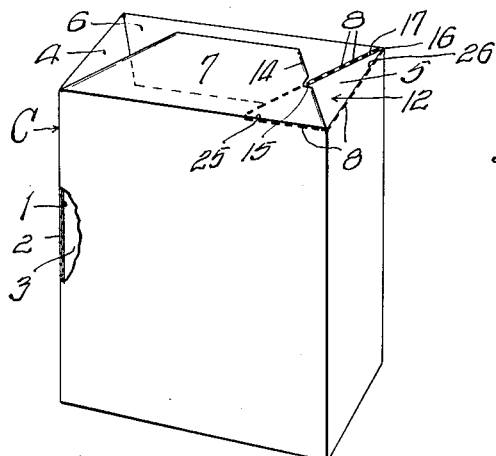
Figures 7 to 12 illustrate a modification of the invention.
Figure 8:
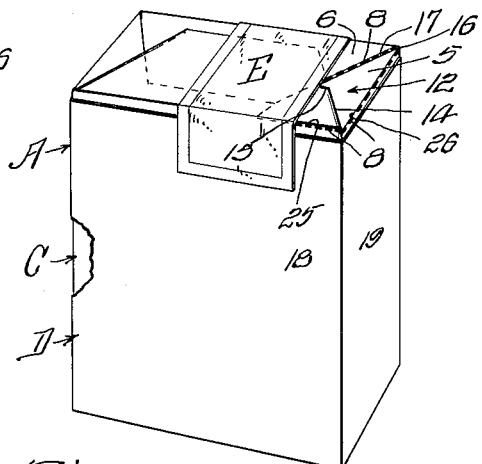
Figure 9:
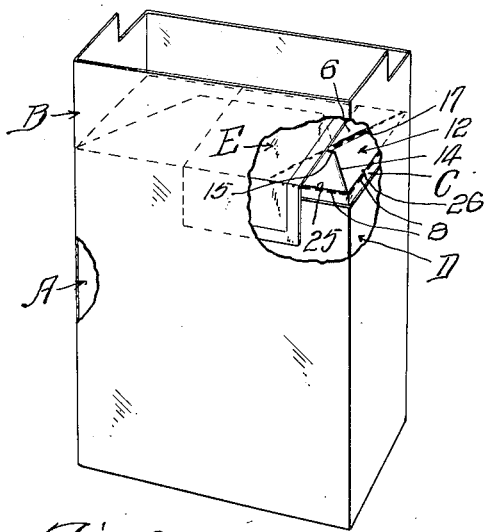
Figure 10:
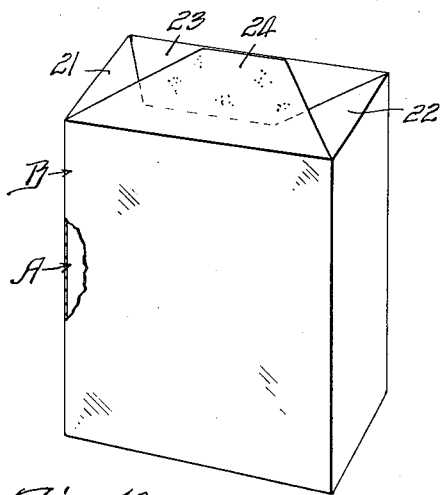

In the modification shown in Figs. 13 to 18, inclusive, the package A is not sealed with a revenue stamp E, as in Figs. 2 and 8, respectively, but I seal the package A by means of a stamp like sticker 27 which is affixed to the top of the package to prevent the removal of contents before the seal is broken or a section of the folded top of the package is torn away, as shown in Figs. 17 and 18. The package C in this instance is not shown as provided with a circuitous line of perforations to define a section of the package to be removed to provide a cigarette outlet, but, the wrapper B is provided with such a line designated 8', and, if desired, the package C can when enclosed in a wrapper B be provided with a circuitous line of perforations, as shown in either Figs. 1 and 7. If it is not desired to affix a sticker 27 to seal the package A, the front fold 7 can be adhesively secured to the back fold 6, in lieu of the sticker 27.

In this modification of the invention, after the package A is inserted into the transparent protective wrapper B, as shown in Fig. 15 and completely enclosed therein, as shown in Fig. 16, a revenue stamp E of the proper class and denomination is affixed to the top of the transparent protective wrapper B to seal the folds 21, 22, 23 and 24, of the package, and render it impossible to remove contents from the package A enclosed in the protective wrapper B without breaking the stamp E, as shown in Fig. 17, by lifting the front fold 24, or otherwise destroying the stamp as by tearing out a local section of the wrapper B when provided with a circuitous line of perforations 8' illustrated in Fig. 17.

After the revenue stamp E has been broken, as shown in Fig. 17, the folds 21, 22, 23 and 24 can be torn away to expose the top of package A, or the package A can be removed from its protective wrapper B and a portion of the top folds 5 and 7 broken away in the usual manner to provide a cigarette outlet 13, as shown in Fig. 18, or, if package C is provided with a circuitous line of perforations to define a removable package section 12, as shown in Figs. 2 and 8, the opening can be formed by the removal of such section, as shown in Figs. 6 and 12. By affixing the revenue stamp to the transparent outer protective wrapper B, it is sure to be broken in getting to the enclosed package A, whereas in the present method of affixing the revenue stamp to the enclosed cigarette package, the revenue stamp is not always broken to render it possible to remove cigarettes from the package after removal from the transparent protective wrapper, or in cases where the upper end of the protective wrapper is merely opened by lifting or tearing away the folds 21, 22, 23 and 24.

In either embodiment of my invention herein described, the revenue stamp is sure to be broken as required by law when opening the package of cigarettes.

In the modification shown in Figure 24, the perforations 8 in the front fold 7 of the package C follow a different path to the left from the notch 15 than disclosed in Figs. 22 and 23, so that after the revenue stamp E has been affixed to the package A, an equal distance from the sides thereof, as shown in Fig. 25, a suitable section of the revenue stamp E will be torn away when removing the package section 12, defined by the circuitous line of perforations 8, to form the cigarette outlet 13, as shown in Fig. 25. In Figs. 2 and 7, the revenue stamp E is shown as affixed closer to one side of the package than the other.

In removing the package section 12 to form the outlet 13 in the top of the package A, downward pressure is applied by the thumb or a finger of one hand adjacent the center of the top of the package, and, with the forefinger and thumb of the other hand the front fold 7 is grasped at the fold line edge 14 thereof, and, by giving it a quick lift or jerk, the section 12 defined by the circuitous line of perforations 8 is instantly removed from the package A, thereby providing a cigarette outlet 13 adjacent the front and one side thereof, as clearly shown in Figs. 6, 12 and 25.

It is obvious that I can provide the outer transparent wrapper B of the cigarette package, if so desired, with a circuitous line of indentations, or perforations, as disclosed either in Figs. 1 or 7, whether or not package C is provided with the circuitous line 8, or whether or not the revenue stamp is affixed to the outer transparent wrapper B. Illustration thereof is not believed necessary in view of the showing on package C.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claim.

What I claim is:

A wrapper for cigarette packages holding twenty cigarettes and comprising a rectangular wrapper sheet of material folded at its upper end along diagonal fold lines to provide four interfolded portions, said sheet being provided with a circuitous score tear line having portions thereof coinciding in part with two of said fold lines and a cutout portion interrupting the scored tear line near one end thereof in one of said portions so as to provide a notch at a fold edge of one of the interfolded portions to facilitate tearing away the section of the wrapper within the confines of the scored tear line.

GUSTAVE W. AEGERTER.